US009248841B1

(12) United States Patent
MacNeille et al.

(10) Patent No.: US 9,248,841 B1
(45) Date of Patent: Feb. 2, 2016

(54) METHODS AND APPARATUS FOR STATE DEPENDENT MICRO-INTERACTION FULFILLMENT

(71) Applicant: Ford Global Technologies, LLC, Dearborn, MI (US)

(72) Inventors: Perry Robinson MacNeille, Lathrup Village, MI (US); Kwaku O. Prakah-Asante, Commerce Township, MI (US); Oleg Yurievitch Gusikhin, West Bloomfield, MI (US); Gary Steven Strumolo, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/551,753

(22) Filed: Nov. 24, 2014

(51) Int. Cl.
*G06F 7/00* (2006.01)
*G10L 21/00* (2013.01)
*B60W 50/10* (2012.01)

(52) U.S. Cl.
CPC ........... *B60W 50/10* (2013.01); *B60W 2540/02* (2013.01)

(58) Field of Classification Search
USPC ............................................. 701/36; 704/275
See application file for complete search history.

(56) References Cited

U.S. PATENT DOCUMENTS

| 7,292,152 | B2 | 11/2007 | Torkkola et al. | |
|---|---|---|---|---|
| 8,412,161 | B2 | 4/2013 | Olincy et al. | |
| 8,781,448 | B2 | 7/2014 | Elliott et al. | |
| 2003/0096593 | A1 | 5/2003 | Naboulsi | |
| 2005/0065711 | A1* | 3/2005 | Dahlgren | G01C 21/26 701/117 |
| 2005/0267759 | A1* | 12/2005 | Jeschke | G10L 15/22 704/270 |
| 2009/0312889 | A1* | 12/2009 | Krupadanam | B60W 20/102 701/1 |
| 2010/0250243 | A1* | 9/2010 | Schalk | G10L 15/30 704/201 |
| 2011/0119062 | A1* | 5/2011 | Dohan | B60Q 1/34 704/275 |
| 2012/0221341 | A1* | 8/2012 | Rodemer | G10L 21/0264 704/275 |
| 2012/0253822 | A1* | 10/2012 | Schalk | G01C 21/3608 704/270.1 |
| 2012/0268294 | A1* | 10/2012 | Michaelis | G06F 9/4443 340/905 |

\* cited by examiner

*Primary Examiner* — Thomas G Black
*Assistant Examiner* — Tyler Paige
(74) *Attorney, Agent, or Firm* — Jennifer M. Stec; Brooks Kushman P.C.

(57) ABSTRACT

A system includes a processor configured to begin an instance of a micro-interaction, requiring a driver response to an issued query for completion. The processor is also configured to receive an occupant-issued wait command instructing delay of the micro-interaction. Further, the processor is configured to wait for a predetermined time period in accordance with the occupant-issued wait command and then re-present the micro-interaction for completion.

20 Claims, 7 Drawing Sheets

FIG. 7

METHODS AND APPARATUS FOR STATE DEPENDENT MICRO-INTERACTION FULFILLMENT

TECHNICAL FIELD

The illustrative embodiments generally relate to a method and apparatus for state dependent micro-interaction fulfillment.

BACKGROUND

Drivers traveling in modern vehicles may have frequent interaction with a vehicle computing system. From interactions as simple as changing a radio station or setting a vehicle climate, to responding in an interactive manner with the vehicle computer, drivers have a much greater degree of interaction with the vehicle computer than in older vehicles, where interaction was limited to simple button presses (e.g., changing the radio). Many of the vehicle computers also include a human machine interface (HMI), which allows the vehicle and human to communicate. This can include, but is not limited to, a touch-selectable input or display, and/or an audio output and input. The vehicle HMI may presents the driver with numerous micro-interactions during a drive, consisting of a question and answer such as "do you want to turn the lights on?" when it gets dark, or "do you want to answer the phone now?" when the phone rings. Typically the answer is a very simple binary choice for a micro-interaction. For example yes/no, now/later, left/right, up/down, on/off, etc.

Many micro-interactions, however, can lead to state changes in the vehicle. For example, a question such as "would you like the windshield wipers off?" will cease the wiping state, which can be problematic if the weather is still rainy. In such an instance, the driver needs to make a decision about the wiper state, and that decision might better be deferred to a later time, if asked at a time where the driver's focus is better on the road, such as when a driver is making a left turn across traffic. If the driver needs to consider the answer to the question, it may be a distraction from more important driving tasks.

Also, radio advertisements may announce opportunities, such as "if you want this great deal, dial xxx-xxx-xxxx". Next-generation systems using connected vehicle technology might utilize this advertisement to output "if want you want this great deal say yes and you will be connected to xxx-xxx-xxxx." Again, some measure of active thought and consideration may be needed to answer or respond, and accordingly the timing of offer presentation may be better left for moments where the driver is not focused on driving.

SUMMARY

In a first illustrative embodiment, a system includes a processor configured to begin an instance of a micro-interaction, requiring a driver response to an issued query for completion. The processor is also configured to receive an occupant-issued wait command instructing delay of the micro-interaction. Further, the processor is configured to wait for a predetermined time period in accordance with the occupant-issued wait command and then re-present the micro-interaction for completion.

In a second illustrative embodiment, a system includes a processor configured to receive a micro-interaction for occupant presentation. The processor is also configured to gather data relating to at least one of vehicle context, vehicle system states and micro-interaction-type, prior to presenting the micro-interaction in a vehicle. Further, the processor is configured to determine if the gathered data matches recorded data defining conditions under which a wait command has been issued with a threshold frequency and then automatically delay presentation of the micro-interaction until a wait-command-associated wait condition is met.

In a third illustrative embodiment, a computer-implemented method includes beginning an instance of a micro-interaction, requiring a driver response to an issued query for completion. The method also includes receiving an occupant-issued wait command instructing delay of the micro-interaction. Further, the method includes waiting for a predetermined time period in accordance with the occupant-issued wait command and then re-presenting the micro-interaction for completion.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
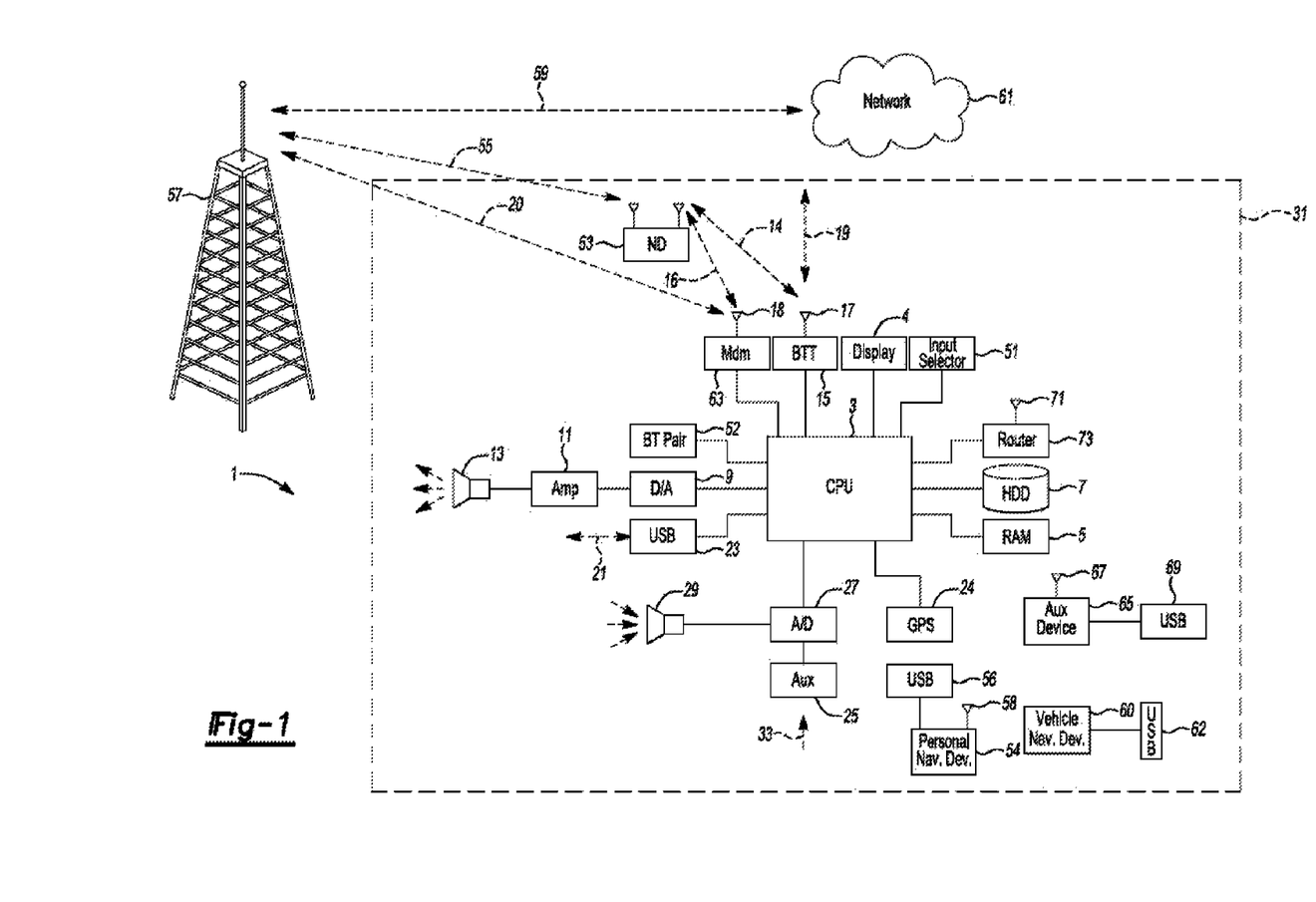
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

Current vehicle based computer software solutions provide opportunities for outside entities and the vehicle computer to interact with vehicle occupants. "Smart" computing systems may need occupant feedback before automatically engaging or disengaging a system. Advertisers may want to deliver custom or semi-custom messages to vehicle occupants, and provide option for vehicle occupant response to advertisements.

Interactions with a vehicle occupant can be known as micro-interactions. A micro-interaction includes a piece of executable software code with four components: 1) code to ask a question; 2) code to receive an answer; and 3) code to execute the result.

Figure 2A:
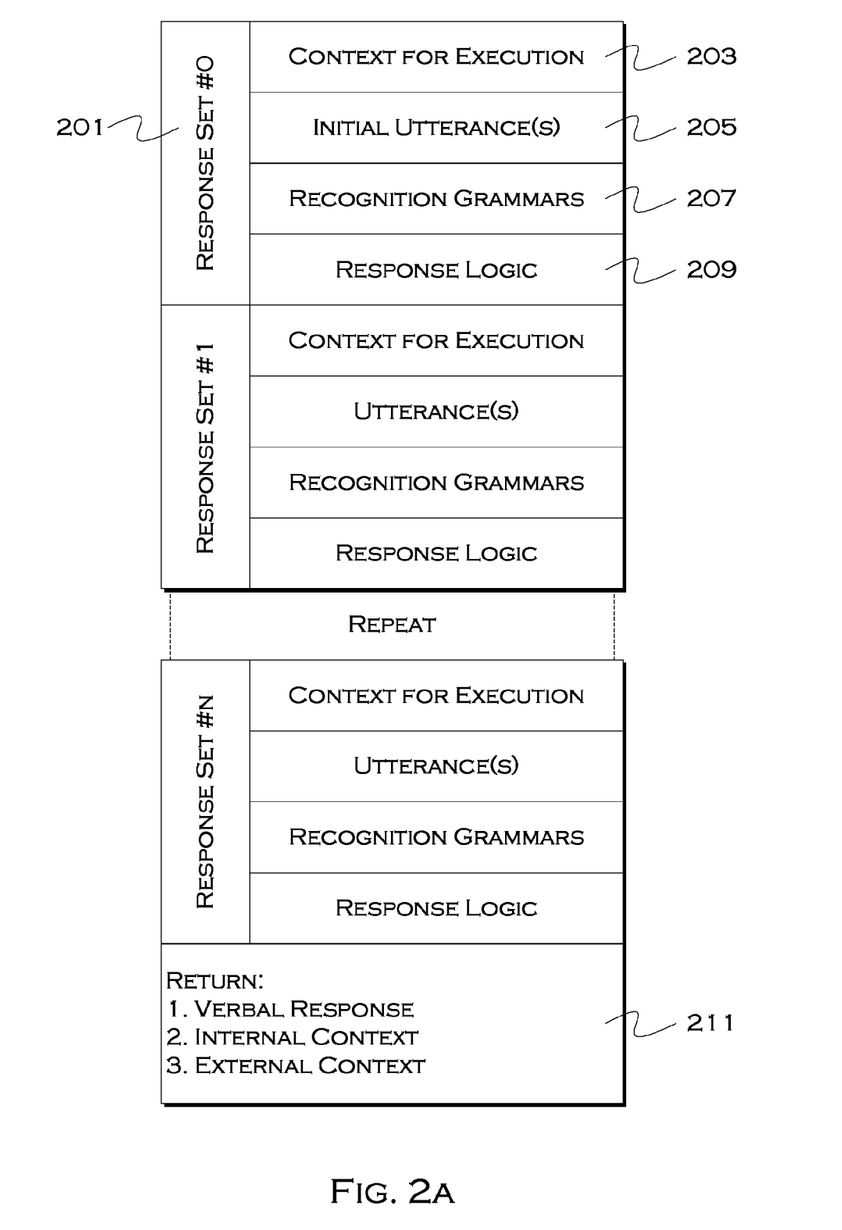
FIG. 2A shows an exemplary micro-interaction structure.

FIG. 2A shows an exemplary micro-interaction structure. In the illustrative example shown in 2A, a number of micro-interaction structures 201 are shown. These are illustrative of one form of micro-interaction, and do not define all types of micro-interaction, but instead are provided as examples of the sorts of vehicle behavior that might be paused by the driver in accordance with the illustrative examples shown herein.

As a part of the micro-interactions, a context for execution is included 203. This context allows the vehicle computer to "know" when to present the micro-interaction. In the case of, for example, a phone call notification, the context may be "immediate," since the phone will only ring for a short period of time. In the context of a food ad, for example, the context may be "when the user is within 3 miles of the restaurant."

Another part of the micro-interaction includes an initial utterance 205. This would be the vehicle output, for example, and in the phone call case could be "a call is incoming from <contact name>, do you wish to answer?" In the food case it could be, "you are currently <distance> miles from McFoodles, would you like to hear their current special offers?"

Since a micro-interaction often involves a user-response, the structure may also include some recognition grammars 207. Different users may answer the same question differently, and since a computer is not "smart," it cannot understand that "yes I would like to hear the special offers," is the same as "yup," in response to a question relating to the special offers, without some guidance. To this end, recognition grammars are provided.

Recognition grammars provide certain words for which a computer is to search in a response, and based on the presence of which, the tone of a response is determined. For example, the words "yes," "yeah," "yup," and "yessir," could all be categorized as positive responses, and "no," "nope," "nah," and "nossir," could all be categorized as negative responses. Then, regardless of the content of the rest of the occupant output, the presence of the trigger word could indicate to the computer which response 209 is to be taken. This allows a computer to recognize a variety of responses without having to account for all possible ways that a question might be answered, or requiring a computer that understands complex sentences.

The response logic tells the computer what action to take based on what response. For example, in response to the special offer question, the system may provide a list of deals in response to a "yes," but provide another question in response to a "no." Or the system may simply exit if the user says "no." Similarly, in response to the phone call question, a "yes" may result in the phone being answered, but a no may result in a further question about sending a brief text response, sending the call to voicemail, putting the caller on hold, etc.

Figure 2B:
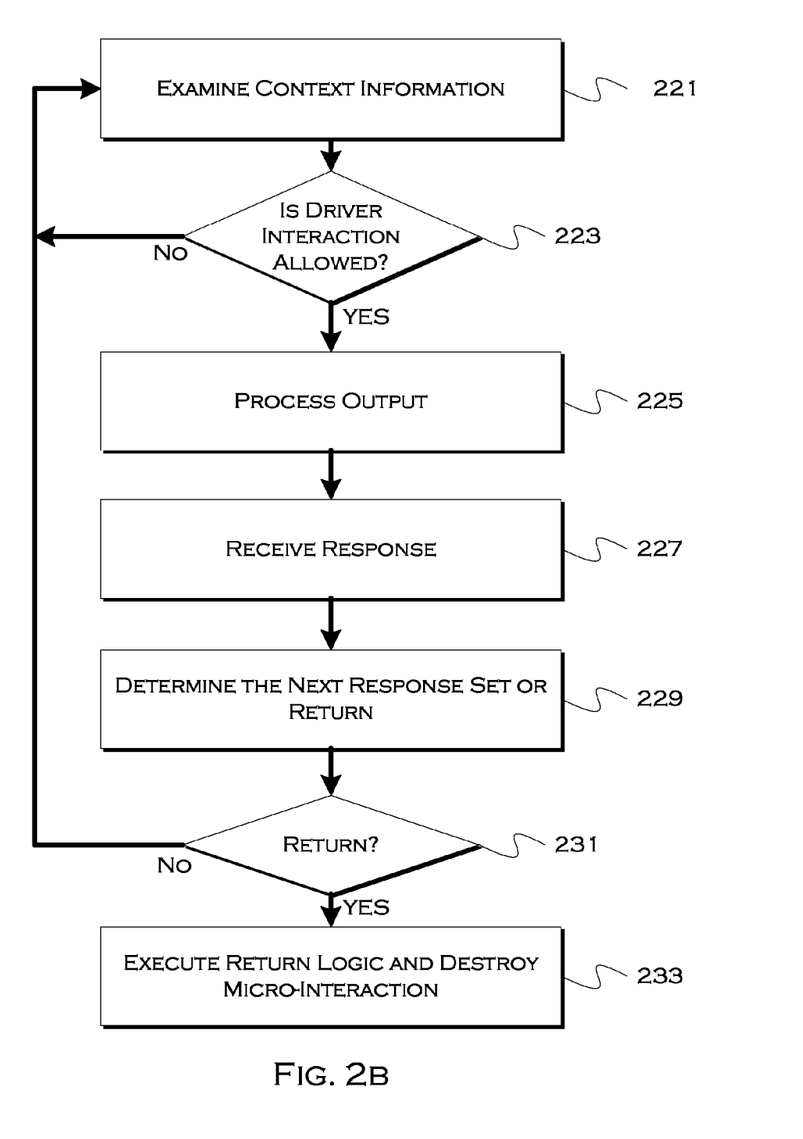
FIG. 2B shows an illustrative process for controlling micro-interaction presentation based on state.

FIG. 2B shows an illustrative process for controlling micro-interaction presentation based on state. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

When the micro-interaction is processed by the vehicle computer, the context delivery instructions that may be included are first examined. If context for presentation instructions exist, the process may examine the current context (weather, occupants, time, location, etc.) to determine whether the context matches the instructed context for delivery 221. If the context is appropriate and driver interaction is permitted 223, the process may proceed to present output to the vehicle occupants 225. This could be, for example, speech, graphic display, haptic signals, etc.

A user response to the interaction is then received 227, which of course could include no response within a specified time. This response is then compared to the recognition grammar to determine what course of action is next taken by the process 229. This involves both the recognition grammar and the response-based step to be taken. If a further micro-interaction is required (return) 231, the process performs the next micro-interaction. Otherwise, the micro-interaction is terminated 233 and destroyed.

Because responding to the question posited by the computer sometimes requires active thought, the driver may not wish to answer question unless there are few other active demands on their attention. A proposed Wait Until Later (WUL) feature detailed in the illustrative embodiments, allows the driver to postpone answering a micro-interaction, including a fourth piece of code—4) code to execute when asked to wait.

Micro-interactions may originate in the Internet, from one of the devices connected to the vehicle computing system or within the vehicle computing system. Regardless of origin, they all require some form of occupant interaction. Thus, they are all appropriate for being subject to consideration of the appropriateness of presentation timing.

Figure 3:
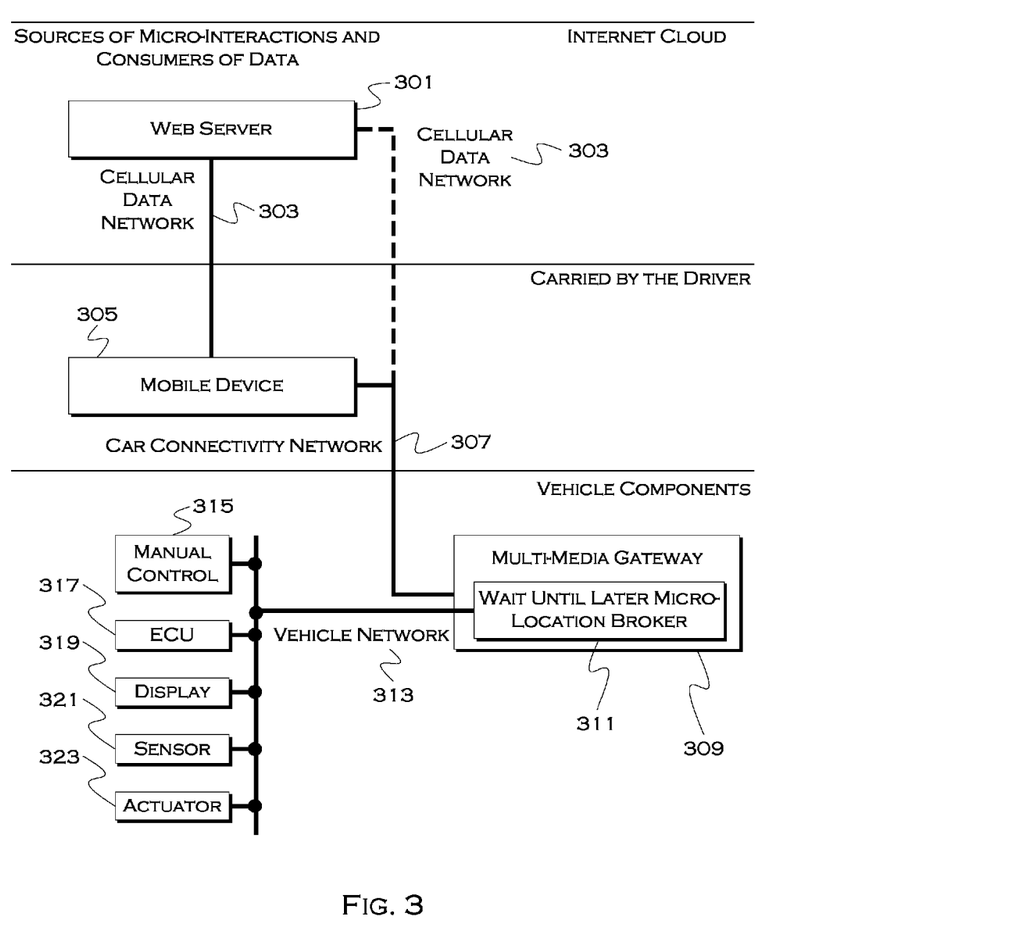
FIG. 3 shows an illustrative system utilizing micro-interactions.

FIG. 3 shows an illustrative system utilizing micro-interactions. In this example, web servers (from which interactions may originate) 301 are connected 303 directly to a vehicle 309 or connected to a driver mobile device 305. The mobile device may then be connected 307 to a vehicle via a connectivity network (e.g., BLUETOOTH wireless interaction).

In the vehicle, a multimedia gateway 309 may include a WUL broker 311, and may also be provided as the mechanism through which the interactions are processed. Through the gateway 309, access to assorted vehicle systems 315, 317, 319, 321, 323 may be provided over a vehicle network 313 (e.g., the CAN bus). These systems can be used for both driver interaction and/or used to determine the context for appropriateness of presentation type decisions.

Even if a vehicle determines that it is an appropriate time to posit a question or present an option requiring/allowing occupant response, the occupant may not be interested in answering this question, questions of this sort, or even any questions at all, when the question is presented. This could be for a variety of reasons, including, but not limited to, occupant mood, vehicle speed, density of traffic, weather conditions, additional vehicle occupants, etc. Accordingly, the occupant is provided with the opportunity to refuse the query. But, if the occupant wishes to respond to the query, and simply cannot do so at the present time, the occupant is also presented with the option to ask the query to wait.

One such way to present the option to wait is an illustrative Wait Until Later feature, examples of which are shown in the illustrative embodiments. The Wait Until Later feature executes the micro-interaction, but parses the driver input and executes Wait Until Later commands before they are passed to the micro-interaction code. Verbal Wait Until Later commands include, but are not limited to:

1) Wait (uses built in rules to determine what to wait for)
2) Wait for one minute
3) Wait for ten minutes
4) Wait for stop at intersection
5) Wait until through intersection
6) Wait until parked
7) Wait for signal light off
8) Wait for steering straight
9) Wait for low lateral acceleration
10) Wait until I say "stop waiting"
11) Cancel (don't want this micro-interaction)
12) Wait until I restart the car
13) Wait until I am done talking
14) etc.

When the driver issues one of these commands the micro-interaction is suspended. The Wait Until Later function monitors events on the vehicle bus, on the Internet and from the driver and applies a set of built in rules to determine when the micro-interaction should resume. The relative weight of rules can be learned online from the driver interactions.

In another aspect of the illustrative embodiments, an embedded system learns and tracks the frequency of times, and the scenarios in which, the driver issues the "wait" command. In addition, the relative importance of the micro-interaction interactions is categorized. The WUL is then automatically engaged when the driver tailored situation is detected before a micro-interaction is initiated. The WUL then provides timely delivery of micro-interactions for increased driver focus and convenience.

The verbal commands can have related commands in other modes of communication between the driver and the vehicle. For example, the driver can make a gesture equivalent to saying "wait", or can press a button on the steering wheel or control panel, or touch a region of a touch screen.

For example: A driver is waiting in a left turn lane, beginning a cooperative acceleration as the vehicle ahead begins to move. A call arrives on the driver's cell phone and the phone app generates a phone call micro-expression for the vehicle computing system. The system live pauses the radio that is playing and says "phone call from your mother, do you wish to answer?"

Without the Wait Until Later function the driver would have to decide whether to say yes or no, but with the wait for me function the driver says "wait." The Wait For Later feature executes the 4th component of the micro-interaction which signals the phone app to put the phone on hold and then suspends itself. The Wait For Later feature executes built in rules that cause it to wait until the left turn signal light shuts off for 5 seconds, then it resumes execution of the micro-expression, which transfers control to the question component and notifies the driver "phone call from your mother, do you wish to answer?" Control is transferred to the answer component and the driver answers "yes", and control is passed to the execution component which signals the phone app to take the phone off hold. The driver begins the conversation.

Figure 4:
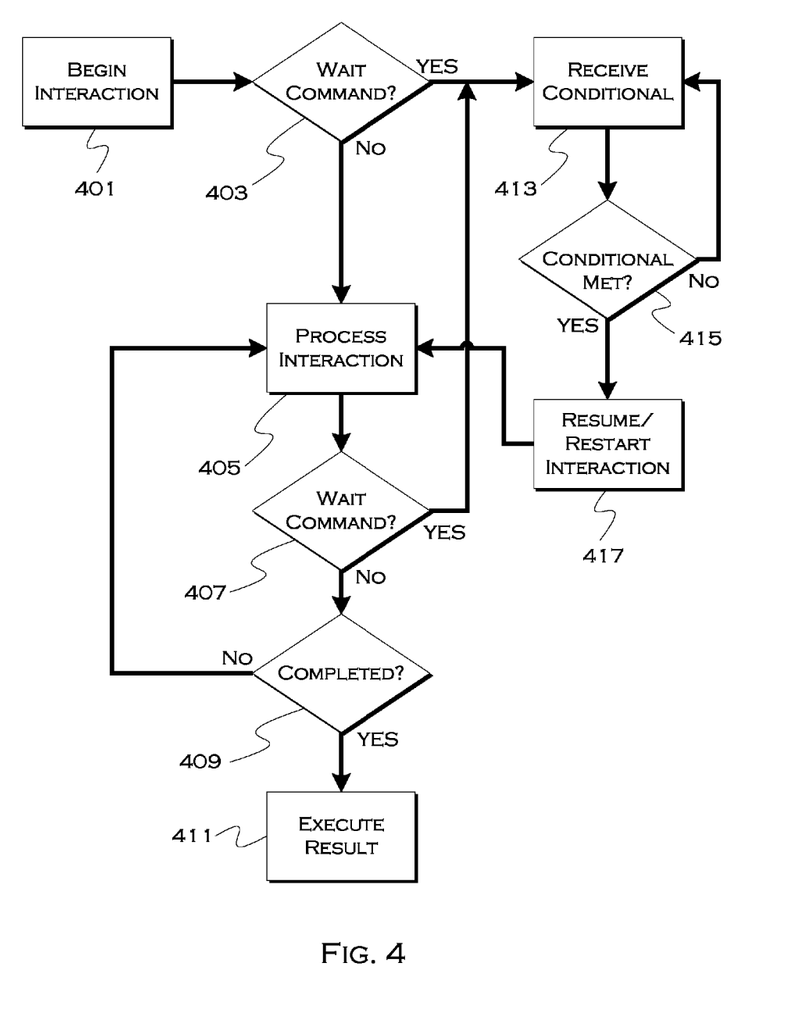
FIG. 4 shows an illustrative process for micro-interaction delay.

FIG. 4 shows an illustrative process for micro-interaction delay. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative interaction, the context is appropriate for interaction presentation, so the process begins the micro-interaction's interactive portion (i.e., presents a question and waits for a response) 401. If the driver does not issue a "wait" command 403, but instead responds to the posited question, the process will proceed with the interaction 405. Since the interaction may actually be a set of interactions, the checking for a "wait" command 407 may have to be repeated a number of times, until the micro-interaction is completed 409.

For example, a driver may respond to the exemplary "special deals" question with a "no." But if this is not the end of the interaction, the driver may not want to complete the interaction at this time, and instead pause the interaction until more time can be given to answering any follow-up questions. For example, the system could next ask "do you want to stop receiving offers from McFoodles?" The driver may have to consider a response, and thus may state "wait until the vehicle is stopped" so that more thought could be given to the answer. Once the vehicle is stopped (the new conditional for delivery), the process can continue the interactions until they are completed 409. Then any appropriate response-based results can be executed 411 (e.g., instructing cessation of delivery of McFoodles offers).

As noted above, a conditional may be included as part of a wait command 413. On the other hand, a command such as "wait" without a conditional may cause the system to pause for a predetermined amount of time. Or, in still another example, if the conditional is always the same "wait until the vehicle is stopped," receipt of a "wait" command may trigger the commonly observed conditional.

In this example, once the conditional is met 415, the process then resumes 405, and the process, wait command receipt, pausing and resumption can continue until the micro-interaction is completed 417.

Figure 5:
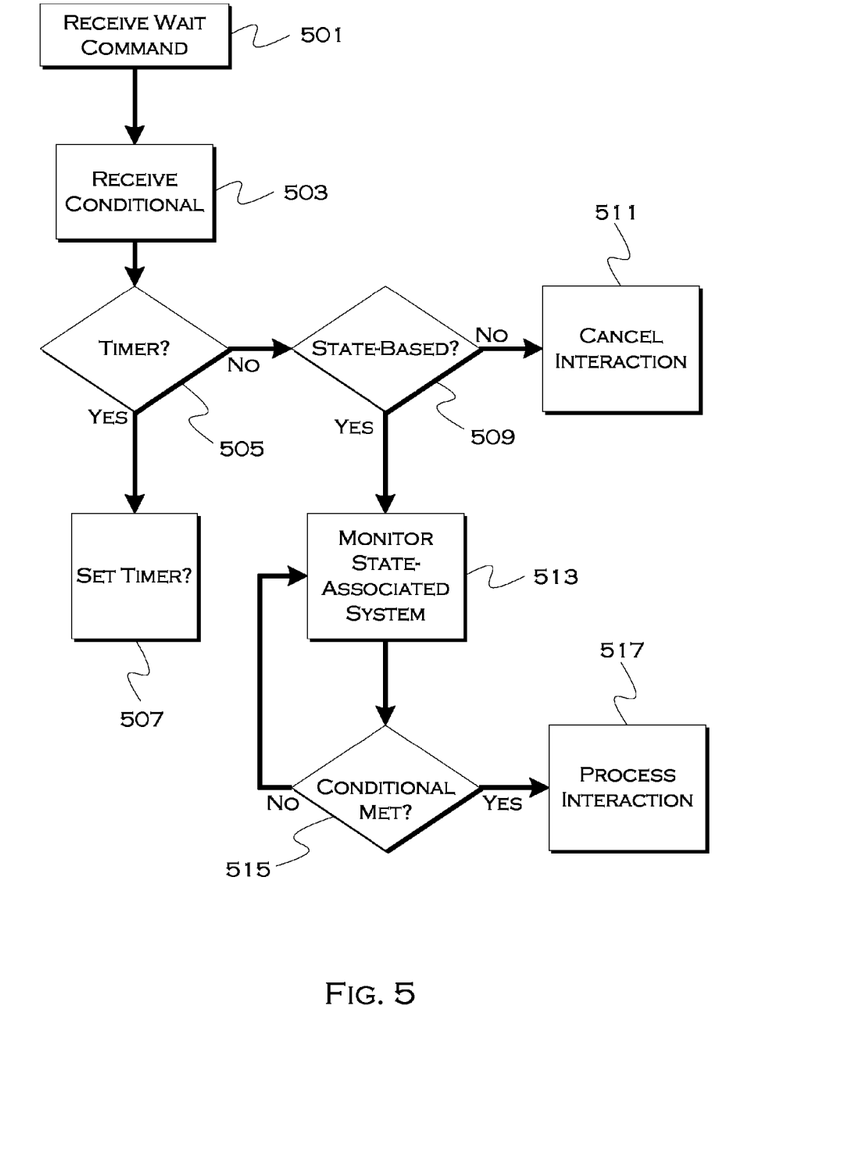
FIG. 5 shows an illustrative process for micro-interaction state delay command processing.

FIG. 5 shows an illustrative process for micro-interaction state delay command processing. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process has received a wait command 501 and an accompanying conditional 503. A typical wait response will either be "wait," or "wait until X happens." The system can be programmed to receive and respond to any number of conditionals, although sometimes the driver may request a condition which the vehicle is not programmed to recognize. In some instances, the driver may simply wish to wait for some period of time before responding.

If the command requires a simple timer 505 (e.g. "wait 10 minutes" or "wait"), the process may proceed to set a timer 507 and then continue when the time has passed. The timer can be predetermined for use with "wait" commands or, for example, may be based on observed user preferences (e.g., the "wait+timer" version of the command always is for 5 minutes).

On the other hand, if an actual vehicle state or context state (e.g., without limitation, "wait until I am stopped" or "wait until it is not raining") is set 509, the process may have to monitor one or more vehicle-associated systems 513 to determine the state or context for delivery. For example, the vehicle speed could be monitored to determine stopping, and a rain-sensor could be monitored to determine the lack of rain. Once the condition is met 515, the interaction can then be processed 517.

It may also be the case that the requested conditional is not recognized, for example, "wait until the next solar eclipse." In such an instance, the system can ask for a recognized conditional or, for example, may simply terminate the interaction 511. In still further instances, unrecognized conditionals may be assigned the same default condition as a simple "wait" command.

Figure 6:
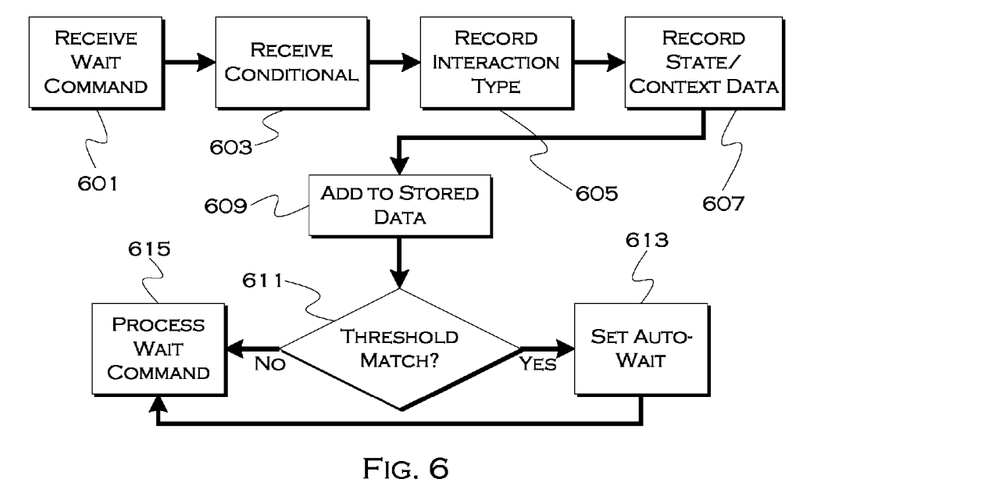
FIG. 6 shows an illustrative process for delay conditional learning.

FIG. 6 shows an illustrative process for delay conditional learning. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Because vehicle computing systems are capable of rudimentary "learning," it may be desirable to learn what sorts of wait commands are issued with which situations, and predictively engage those wait commands absent even any instruction from a user. For example, if a user always issues a "wait until it is not raining" command any time a micro-interaction is received while it is raining, the system can predictively engage this wait command when a context is otherwise proper for interaction delivery and it is raining. Similarly, for example, a user who issues a "wait until I am off the highway" command with a high degree of frequency may have this wait command predictively engaged whenever the context is appropriate and the user is traveling on a highway.

On the other hand, certain micro-interactions may ignore automatic-wait commands based on severity. For example, an interaction stating "your vehicle is low on fuel, would you like to find the closest gas station" may ignore automatic wait command settings, since the message is "critical" and it should be up to the user to specifically ignore the message for the time being, if desired. Occupant presence can be determined using known techniques, including, but not limited to, identification of occupant based on mobile device, observation of driving behavior, etc.

In the illustrative process shown in FIG. 6, "learning" is performed by the processor by observing and recording common instances of "wait" commands, along with accompanying context. In this example, a "wait" command is received 601 following presentation of a micro-interaction.

Also in this example, a conditional 603 is received, although this is not necessary. The system is also capable of tracking simple "wait" commands without conditionals (also known as a NULL condition), and applying the standard (typically predefined) wait for such commands. In this example, the process begins by recording a type of the micro-interaction 605. Micro-interactions can vary greatly in type, from coupons and advertisements, to vehicle setting adjustment, to maintenance alerts, and it is possible to classify user behavior based on micro-interaction type as well as other context data. Even within a classification such as "advertising," there may be numerous actual sub-types (e.g., without limitation, fast food, sit down restaurant, drive-through service, Mexican, Italian, American, etc.).

In addition to recording the interaction type, the process may record state and/or context data 607. As previously noted, context data includes a variety of factors, such as, but not limited to, number of occupants, weather, time of day, location, traffic level, etc. State data can include, but is not limited to, various vehicle states (steering wheel tilt, blinker state, vehicle speed, radioactive/inactive, etc.).

A data repository is created and stored for each driver profile at a location accessible by the process. This could be locally stored or stored on the cloud with respect to a driver account. The repository tracks instances of wait commands, and/or the accompanying conditionals, whenever wait commands are issued, for the associated contexts. For example, if a driver always issues a "wait for stop at intersection" command whenever a food advertisement is played, the process will record such instances with respect to food advertisements. Sufficient observation will reveal that only a not-stopped-at-intersection state matters with respect to these micro-interactions, so other contexts can be ignored, and any time a food-related micro-interaction is present, the vehicle will learn to automatically engage the typically requested wait command.

On the other hand, it may be the case that the driver only issues the "wait for stop at intersection" when a micro-interaction (food based or otherwise) occurs and it is raining or the vehicle is traveling at more than 50 miles per hour. The instances of the wait command would be saved with respect to these contexts/vehicle states, and future micro-interactions (once a learning threshold has been crossed) will be automatically delayed if it is raining or the vehicle is traveling over 50 miles per hour. Note that, as used herein, "context" is a fairly broad description of a variety of factors and can include vehicle states, even though vehicle states are also discussed independently.

Once the appropriate context/state data has been observed and recorded 607, an instance of the wait command and any accompanying conditional can be added to the data repository for the respective context(s) and/or state(s) 609. If the number of instances of an observed command for a given state/context/ad-type pass a predefined threshold 611, the process can set an auto-wait function 613. This will cause the system to automatically engage a wait+appropriate context command when the observed threshold level conditions occur. Otherwise, the system will process the wait command 615 and continue on, until sufficient instances of the command occur to cause a threshold to be met.

The threshold can be based on a percentage of occurrences or, for example, can be based on an aggregate total number of occurrences. Other thresholds can also be set, as appropriate. The system may also record context/state for instances of micro-interactions where wait commands were not issued, or may decay recorded data when such instances occur, so that an accurate depiction of how frequently a driver issues the wait commands can be observed.

Figure 7:
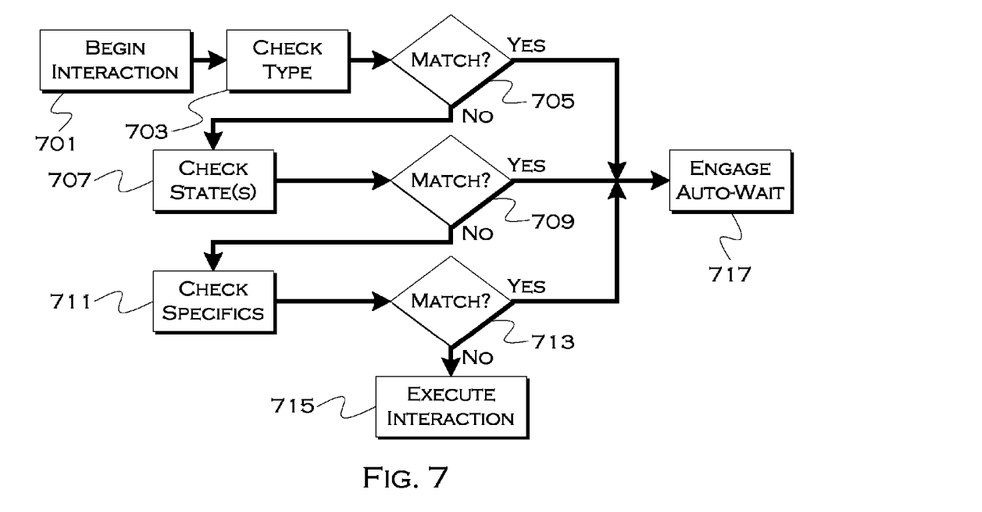
FIG. 7 shows an illustrative process for automatic delay engagement.

FIG. 7 shows an illustrative process for automatic delay engagement. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

This illustrative process engages the wait or wait+conditional whenever an appropriate scenario occurs under which the driver would (based on observation or driver settings), commonly issue a wait command. In at least one example, in addition to or instead of tracking frequency of issued wait commands, the process may also ask the driver if a wait command should be set for a given context or advertisement type following the issuance of the wait command. This query may also be delayed until the actual micro-interaction is processed, since the query itself is a form of micro-interaction and thus could be subject to the driver's desire not to interact with the system at the immediate time of occurrence.

In this process, a micro-interaction begins 701 based on the occurrence of the appropriate conditionals for that particular micro-interaction. First, in this example, the process checks the "type" of interaction 703 (e.g., without limitation, advertisement, vehicle system, etc.). Type definitions can be as granular as appropriate, so "advertisement" may not provide sufficient distinction and instead may be sub-categorized as appropriate.

If there is a match 705, which in this case indicates that the "type" has automatic waiting associated therewith, the process will engage the appropriate automatic wait command 717 based on previously observed behavior. If there is not a match, the process will then proceed to check vehicle states 707. As previously noted, the process may have observed that if windshield wipers are engaged and the vehicle is traveling at over N miles per hour, the driver always issues a wait command. So, if the vehicle states match 709 the conditions for issuance of a wait command, regardless of interaction type, the process may automatically engage a wait command for that micro-interaction 717. Again, the type of conditional engaged, if any, can be based on observed previous behavior.

Finally, in this example, the system may check context 711. This can include, but is not limited to, road type, traffic level, weather, number of people present, occupant makeup (e.g., children present), time of day, day of week, etc. If the driver always issues wait commands such as "wait until vehicle stopped" whenever children are present, then detection of one or more children in the vehicle could cause the automatic issuance of a wait command+the until-vehicle-stopped conditional for any micro interaction when children are present. If there is a match 713 between any current context and any context for which an applicable pattern has been observed, the process can engage the automatic waiting 717. If none of the states/contexts/ad-types match previously observed behavior for which sufficient data has been gathered, the process can execute the micro-interaction (which may, of course, result in the receipt of an occupant-initiated wait command) 715.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
    a processor configured to:
        begin an instance of a micro-interaction, requiring a driver response to an issued query for completion;
        receive an occupant-issued wait command instructing delay of the micro-interaction;
        wait for a predetermined time period in accordance with the occupant-issued wait command; and
        re-present the micro-interaction for completion.

2. The system of claim 1, wherein the processor is configured to receive a conditional in conjunction with the wait command, and wherein the processor is configured to wait until the conditional is met in lieu of waiting for the predetermined time period.

3. The system of claim 2, wherein the conditional involves a time period to elapse.

4. The system of claim 2, wherein the conditional involves a vehicle state change.

5. The system of claim 2, wherein the conditional involves a context change.

6. The system of claim 1, wherein the processor is configured to record vehicle states in conjunction with the received wait command.

7. The system of claim 1, wherein the processor is configured to record vehicle context in conjunction with the received wait command.

8. The system of claim 1, wherein the processor is configured to record micro-interaction-type in conjunction with the received wait command.

9. A system comprising:
a processor configured to:
receive a micro-interaction for occupant presentation;
prior to presenting the micro-interaction in a vehicle, gather data relating to at least one of vehicle context, vehicle system states and micro-interaction-type;
determine if the gathered data matches recorded data defining conditions under which a wait command has been issued with a threshold frequency; and
automatically delay presentation of the micro-interaction until a wait-command-associated wait condition is met.

10. The system of claim 9, wherein the wait condition is a NULL condition, and wherein the processor is configured to delay presentation for a predetermined time period associated with a NULL condition.

11. The system of claim 9, wherein the condition involves a vehicle state change, and wherein the processor is configured to delay presentation until the vehicle state change occurs.

12. The system of claim 9, wherein the condition involves a context change, and wherein the processor is configured to delay presentation until the context change occurs.

13. The system of claim 9, wherein the vehicle context includes a time of day.

14. The system of claim 9, wherein the vehicle context includes weather conditions at a vehicle location.

15. The system of claim 9, wherein the vehicle context includes a traffic-level at a vehicle location.

16. The system of claim 9, wherein the vehicle context includes whether or not children are present as vehicle occupants.

17. The system of claim 9, wherein the vehicle context includes a road-type on which the vehicle is traveling.

18. The system of claim 9, wherein the vehicle context includes a day of week.

19. The system of claim 9, wherein the vehicle context includes a vehicle location.

20. A computer-implemented method comprising:
beginning an instance of a micro-interaction, via a vehicle computer, requiring a driver response to an issued query for completion;
receiving an occupant-issued wait command instructing delay of the micro-interaction;
waiting for a predetermined time period in accordance with the occupant-issued wait command; and
re-presenting the micro-interaction for completion.

* * * * *